US008586222B2

(12) United States Patent
Timmons et al.

(10) Patent No.: US 8,586,222 B2
(45) Date of Patent: Nov. 19, 2013

(54) LITHIUM-ION CELL WITH AN ARRAY OF REFERENCE ELECTRODES

(75) Inventors: Adam T Timmons, Southfield, MI (US); Mark W. Verbrugge, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 693 days.

(21) Appl. No.: 12/756,251

(22) Filed: Apr. 8, 2010

(65) Prior Publication Data

US 2011/0250478 A1  Oct. 13, 2011

(51) Int. Cl.
*H01M 10/48* (2006.01)
*H01M 4/00* (2006.01)

(52) U.S. Cl.
USPC .................. 429/92; 429/91; 429/128

(58) Field of Classification Search
USPC ........................................... 429/91
See application file for complete search history.

(56) References Cited

U.S. PATENT DOCUMENTS

| 2006/0093872 A1* | 5/2006 | Howard et al. ............ 429/9 |
| 2007/0182418 A1 | 8/2007 | Reynier et al. |
| 2008/0050644 A1 | 2/2008 | Christensen et al. |
| 2009/0104510 A1* | 4/2009 | Fulop et al. ............... 429/50 |

FOREIGN PATENT DOCUMENTS

JP  2005019116 A  *  1/2005

OTHER PUBLICATIONS

JP 2005019116 A, Machine Translation provided by JPO.*
Guo Jinnian et al.; Development Of Cathodic Protection Potential Survery Equipment For Submarine Pipelines; (Institute of Matter Structure Study, Academia Sinica, Xiamen); Marine Sciences; No. 5; Sep. 1990.

* cited by examiner

*Primary Examiner* — Barbara Gilliam
*Assistant Examiner* — Robert S Carrico
(74) *Attorney, Agent, or Firm* — Reising Ethington P.C.

(57) ABSTRACT

A cluster or array of reference electrode materials is prepared and used to monitor the state of charge of positive and negative active electrode materials of a lithium-ion cell. The reference electrode materials are composed so as to provide useful electrochemical potential values when placed in the same electrolyte in proximity with a positive or negative electrode. The array of reference electrodes includes at least two electrically discrete instances of reference electrode materials. Such duplication of reference material in the array permits confirmation of the present quality and activity of a reference material used for evaluation of positive and/or negative electrode material in a lithium-ion cell.

14 Claims, 3 Drawing Sheets

LITHIUM-ION CELL WITH AN ARRAY OF REFERENCE ELECTRODES

TECHNICAL FIELD

This invention pertains to the use of reference electrodes in at least one cell of a lithium-ion battery to monitor and help manage the state of charge and state of life of a battery containing the cell(s). More specifically, this invention pertains to the use of an array of reference electrodes of like and different compositions in a lithium-ion battery cell to monitor the state of charge and state of life of the cell and help manage the discharge and re-charge of the cell.

BACKGROUND OF THE INVENTION

Lithium-ion secondary batteries are common in portable consumer electronic devices because of their high energy-to-weight ratios, lack of memory effect, and slow self-discharge when not in use. Rechargeable lithium-ion batteries are also being designed and made for use in automotive applications to provide energy for electric motors to drive vehicle wheels.

Lithium-ion batteries may be formed in different sizes and shapes but three common functional components are the anode, cathode, and electrolyte that make up cells of the battery. Technically, the anode on discharge becomes the cathode on charge, and the cathode on discharge becomes the anode on charge. From here forward, we shall refer to the electrode that is the anode on discharge (the negative electrode) as the anode, and the electrode that is the cathode on discharge (the positive electrode) as the cathode. Typically, a porous separator is used to contain electrolyte and prevent physical contact (electron-conducting contact) between the anode and cathode. Many cells may be arranged in series or parallel electrical current flow connection, or any suitable combination thereof, to meet the electrical potential and power requirements of a battery design.

A lithium-ion battery generally operates by reversibly passing lithium ions between a negative electrode and a positive electrode. Typically, the negative and positive electrodes are situated on opposite sides of a microporous polymer separator that, along with the electrodes, is soaked with an electrolyte solution suitable for conducting lithium ions. Typically, each of the negative and positive electrodes is also carried on, or connected to, a metallic current collector (generally copper for the anode and aluminum for the cathode). During battery usage, the current collectors associated with the two electrodes are connected by a controllable and interruptible external circuit that allows an electron current to pass between the electrodes to electrically balance the related transport of lithium ions through each cell. Many different materials may be used to produce these various components of a lithium-ion battery. But in general, the negative electrode typically includes a lithium insertion material or alloy host material, the positive electrode typically includes a lithium-containing active material that can react with lithium at higher potential than the reaction with lithium at the negative electrode, and the electrolyte solution typically contains one or more lithium salts dissolved and ionized in a non-aqueous solvent. The contact of the anode and cathode materials with the electrolyte results in an electrical potential between the electrodes and, when an electron current is permitted to spontaneously flow during discharge in an external circuit between the electrodes, the potential is sustained by electrochemical reactions within the cells of the battery.

A lithium-ion cell or battery, or a plurality of lithium-ion batteries that are connected in series direct current flow or in parallel flow arrangement (or any suitable combination thereof) for current flow, can be utilized to reversibly supply power to an associated load device. The battery system delivers electrical power on demand to a load device such as an electrical motor until the lithium content of the negative electrode (anode) has been depleted to a predetermined level. The battery may then be re-charged by passing a suitable direct electrical current in the opposite direction between the electrodes.

At the beginning of the discharge, the negative electrode of a lithium-ion battery contains a high concentration of inserted lithium while the positive electrode is relatively depleted. The establishment of a closed external circuit between the negative and positive electrodes under such circumstances causes the transport of lithium from the anode to the cathode. The anode is spontaneously oxidized creating lithium ions and electrons. The lithium ions are carried through the micropores of the interposed polymer separator from the negative electrode (anode) to the positive electrode (cathode) through the ionically conductive electrolyte solution while, at the same time, the released electrons are transmitted through the external circuit from the negative electrode to the positive electrode (with the help of the current collectors) to balance the overall electrochemical cell by maintaining charge neutrality in the electrodes. The lithium ions spontaneously react with the cathode material by an electrochemical reduction reaction. The flow of electrons through the external circuit can power a load device until the level of intercalated lithium in the negative electrode falls below a workable level or the need for power ceases.

The lithium-ion battery may be recharged after a partial or full discharge of its available capacity. To charge or re-power the lithium-ion battery, an external power source is connected to the positive and the negative electrodes to drive the reverse of battery discharge electrochemical reactions. That is, during charging, the lithium within the positive electrode is oxidized to yield lithium cations and electrons. The cations transport across the separator to the negative electrode, and the electrons travel through the external circuit to the negative electrode as well. At the negative electrode, the lithium cations react with the negative electrode material through an electrochemical reduction reaction, and the negative electrode lithium content increases. Overall, the charging process reduces the lithium content within the positive and increases the lithium content within the negative.

In many lithium-ion battery applications it is preferred to periodically or continuously monitor the electrochemical potential of the electrode materials in the battery as a measure of their state of charge or state of health (their condition). Knowledge of the state of charge or state of health may be important for high charge rate or high discharge rate applications such as power tools and partially or fully electrified vehicles. The electrochemical potential of electrode materials may be altered and permanently lost if, for example, the cells of the battery are discharged too rapidly or overcharged often causing lithium to plate on the surface of the negative electrode. In order to monitor the electrode materials, a reference electrode has been placed in one or more cells of the battery in such a way as to monitor the state of charge of at least one or both of the positive and/or negative electrodes of the cell. The connection is a high impedance connection that draws very little current from the positive or negative electrode but the potential (voltage) of the positive and/or negative electrode in the cell electrolyte with respect to the reference is measured. These voltage values (reference electrode vs. positive and/or negative electrode) may be obtained in a battery as the cells are being charged or discharged, and collected for computer analysis and control of the discharge and charge rates of a battery.

However, the effectiveness of a reference electrode depends on its stability in an operating cell. There remains a need for improvement in the design and application of a reference electrode in a lithium-ion battery.

SUMMARY OF THE INVENTION

Both positive and negative electrodes in a lithium-ion cell contain some lithium during a normal discharge mode and charge mode of cell operation. A reference electrode in a lithium-ion cell is useful when it maintains a constant lithium-reaction potential while the electrochemical potentials of the positive and negative electrodes change as they furnish the transfer of ionic charge inside of the cell that is matched with the transfer of electric charge through an external circuit that does useful work like powering a motor to drive the wheels of a passenger vehicle. A reference electrode is typically comprised of a lithium-containing material, capable of providing a lithium-reaction potential that is stable over a wide variety of conditions and over long periods of time, to provide a means to measure the potentials of the positive and negative electrodes independent of their potential difference with respect to each other. Examples of potentially suitable reference electrode materials include $Li_{5.5}Ti_5O_{12}$, $Li_{0.5}Al$, and $Li_{0.5}FePO_4$. The function of a reference electrode is a consequence of its composition and method of preparation and of chemical changes that may occur within the electrode as it operates in its cell's internal environment.

The inventors herein have recognized, that if the lithium-reaction potential of the reference electrode changes (sometimes called "drift") while the Li-reaction potentials of the positive and/or negative electrodes change, then such a reference electrode cannot facilitate the accurate measure of the lithium-reaction potential of the positive or negative electrodes as a function of their states of change. Such a reference electrode ceases to be useful.

In order to determine if the Li-reaction potential of a reference electrode has drifted, another reference electrode is needed, made of the same or of different material. If the second has drifted, then a third will be needed to determine the drift of the first two. Since any reference electrode is susceptible to drift then an array of reference electrodes is needed to constantly monitor each other. How many reference electrodes are optimal in the array is a balance between having as many as possible and limiting the number to what can be practically employed. The Li-reaction potential of a reference electrode drifts, for example, because of oxidation or reduction reactions that donate lithium into the electrode or strip lithium from it. If the reference electrode's potential has drifted because lithium was stripped, then lithium needs to be donated to counteract the drift. For this reason, a source of lithium hosted in an unsaturated lithium storage material should be part of the reference electrode array such that Li-reaction potentials of the reference electrodes can be adjusted to counteract for drift independent of the operation and current-deriving function of the positive and negative electrodes in the lithium-ion cell. The inventors note, additionally, that if the reference electrode elements are quite small, then their columbic capacity relative to that of either the positive or the negative electrodes will be minimal. In such cases, it is possible to charge the reference electrodes by passing current between the respective reference electrode element and the positive or negative electrode without changing significantly the battery capacity.

Embodiments of this invention use an array of several reference electrodes to simultaneously monitor the electrochemical potential (voltage) of the positive and negative electrodes in a cell of a lithium-ion battery. An assembly of the array of reference electrodes is immersed in the cell electrolyte in positional relationship with the positive and negative electrodes so that ionic flow to or from the positive and negative electrodes is not affected. In many embodiments of the invention, both the negative electrode and the positive electrode of a lithium-ion cell are checked at different times using the same array of reference electrodes.

Two or more of the reference electrodes may be substantially identical. Other reference electrodes in the array may be of a different lithium-containing composition so as to react differently to the electrochemical environment of a lithium-ion battery (and hopefully experience a different or less tendency to drift). For example, combinations of two or more reference electrodes of each of $Li_{5.5}Ti_5O_{12}$, $Li_{0.5}Al$, and $Li_{0.5}FePO_4$ may be used in an array for a lithium-ion cell. These different composition reference electrodes are thus devised or selected to be complementary to other electrodes in the array of electrodes so that one or more reference electrodes will continue to serve during the working life of the battery. And, as stated above, it is preferred that a source of lithium is included in the electrode array to facilitate the transfer of lithium ions to lithium-depleted reference electrodes such as by transfer of lithium ions from a lithium-rich reference electrode (e.g., an electrode containing lithium intercalated in carbon as $LiC_{12}$). Or, as noted above, for very small reference electrode elements, the positive and/or negative electrodes may act as lithium sources.

An array of small bodies (dots, small pads, or the like) of the respective electrode materials may be placed on a surface of an electrical insulator material (such as a sandwich of silicon nitride wafer chips) that is chemically and electrochemically inert in the electrolyte and cell environment. The substrate and reference electrode bodies are sized and shaped to fit suitably and effectively in the electrolyte in a predetermined cell location. The substrate will often be a thin, flat chip(s) of suitable plan view shape (e.g., square, rectangular, round) for insertion in a cell. For example, five to eight small, round reference electrode pads having diameters and heights in the low micrometer size range may be formed in the surface of a rectangular silicon nitride wafer having a thickness of about five to ten times the heights of the reference electrode pads. Reference electrode pads having diameters (or major dimension parallel to a substrate surface) of from a few nanometers to about fifty micrometers and heights of from a few nanometers to about twenty-five micrometers may be partially embedded in a suitable electrically insulating substrate having a thickness, for example, of up to about two hundred fifty micrometers. These reference electrode arrays are easily inserted in or near a porous, electrolyte-containing separator in a lithium-ion cell.

A separate insulated, electrically conductive wire is led from each reference electrode material through its insulating and isolating substrate to a suitable connector outside the cell and battery. Of course, each lead wire is insulated and isolated from the cell environment. Each electrical lead can be used in different ways by providing means for different and separate connections with positive and/or negative electrodes in the cell, or with other electrodes in the array for transfer of lithium, and for submitting electrochemical potential values with respect to a positive and/or negative electrode to a data storage and computer based system for controlling discharge and re-charging of the battery.

Other objects and advantages of the invention will be apparent from a description of illustrative embodiments of practices of the invention. These descriptions are presented to illustrate embodiments of the invention and not limit its scope. In the descriptions, reference will be made to some drawings which are described in the following section of this specification.

BRIEF DESCRIPTION OF THE DRAWINGS

FIG. 2A also illustrates a suitable placement position for a reference electrode array (enlarged view) in the flat-cell. A cell with which such an array of reference electrodes may be used may have electrode and packaging geometries other than stacked rectangular electrodes in a rectangular flat cell, i.e. the cell may be a shape other than flat and may contain a wound or folded electrode assembly or assemblage of electrode assemblies.

DESCRIPTION OF PREFERRED EMBODIMENTS

Figure 1:
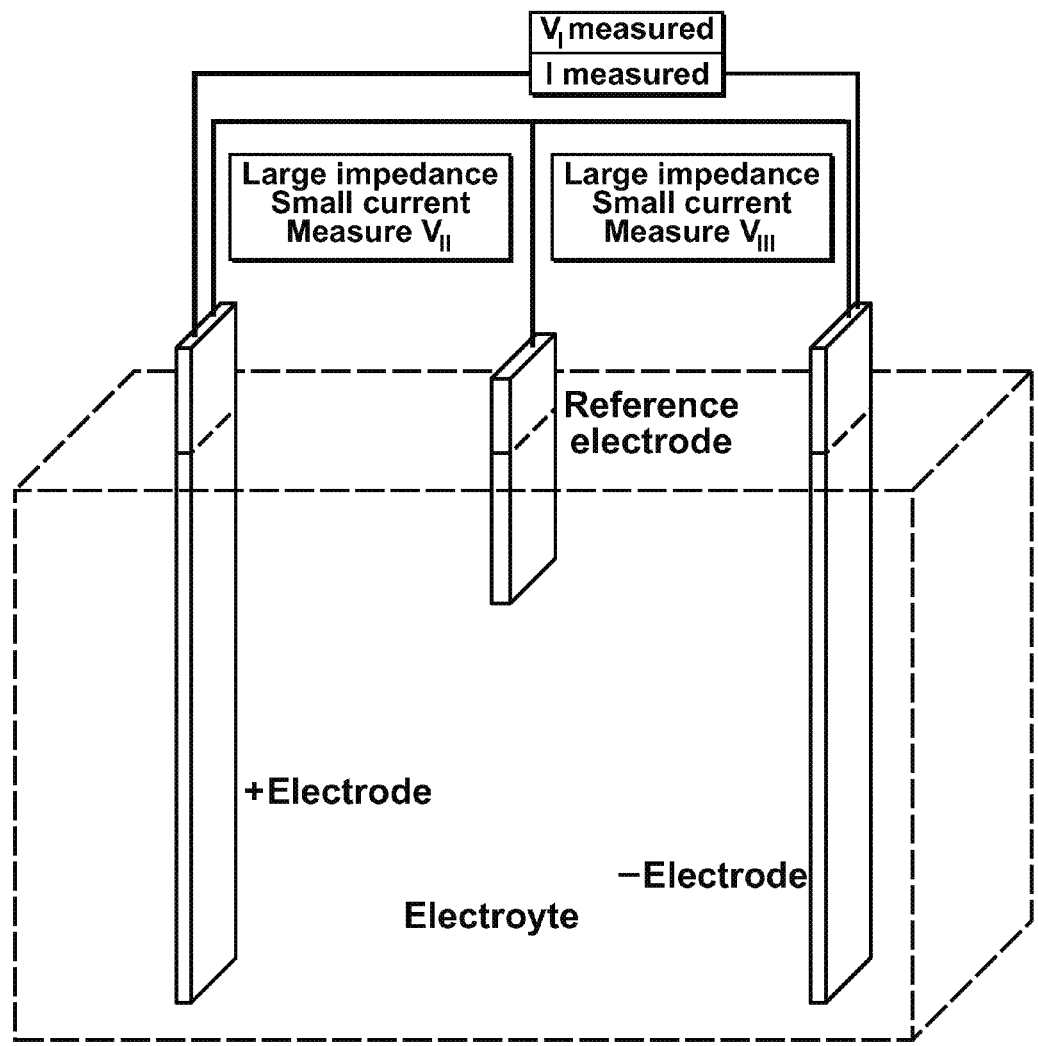
FIG. 1 is an illustration of a positional relationship and electrical connection relationships of a reference electrode with respect to a positive and negative electrode in an electrochemical cell. Each of the electrodes in an electrochemical cell would also be immersed in an electrolyte which may be visualized in this Figure as filling the volume within the dashed lines. An electrochemical cell might also contain a separator (not shown) that prevents physical touching of the electrodes and any electron flow between them in the cell.

As described above, a reference electrode in a battery cell may be used to provide measurements of a representative voltage of a positive and/or negative electrode of a cell while the positive and/or negative electrode is "working" and experiencing an electrochemical reaction. FIG. 1 illustrates a generalized electrochemical cell with positive (+) and negative (−) electrodes, and a reference electrode each immersed in an electrolyte within suitable container represented by a dashed-line rectangular box-shape. The positive and negative electrodes are physically separated from each other but both are in contact with a suitable electrolyte which is composed to conduct a flow of ions between positive and negative electrodes as the cell is being discharged or re-charged. As the cell is working an electronic current flows in an external circuit between the positive and negative electrodes. This current (I) may be measured and the potential (voltage, $V_I$) between the positive and negative electrodes may be measured. A cell may also contain a reference electrode as illustrated in FIG. 1. The reference electrode is immersed in the electrolyte but spaced from physical contact with the positive and negative electrodes.

The reference electrode is connected through a large impedance connection (tantamount to an open-circuit connection) to the positive and negative electrodes and a voltage measured between the positive and negative electrode and the reference electrode ($V_{II}$ and $V_{III}$, respectively in FIG. 1). By keeping the current flowing between the reference electrode and positive and/or negative electrode very small, no instantaneous irreversible voltage losses intrude on the potential measurement. Stable and reproducible potentials that are free from voltage offsets caused by the product of finite and unavoidable internal resistances with finite currents are the result for the positive or negative electrode/reference electrode circuit as the currents between the positive electrode and the reference electrode or the negative electrode and the reference electrode are essentially zero. This information, if reliable, may be used in managing the operation of a battery.

Thus, the voltage between a suitable reference electrode and a positive or negative electrode provides information as to the state of charge of a selected working electrode, cathode or anode, because the voltage measured between a reference and a positive or negative electrode is a function of the lithium concentration in the positive or negative electrode. In practices of this invention, attention is given to assure that the condition of a reference electrode is providing a useful voltage with respect to the working electrode under consideration. But, first, it may be useful to describe an illustrative electrode assembly for a lithium-ion battery with which an array of reference electrodes may be used.

Figure 2A:
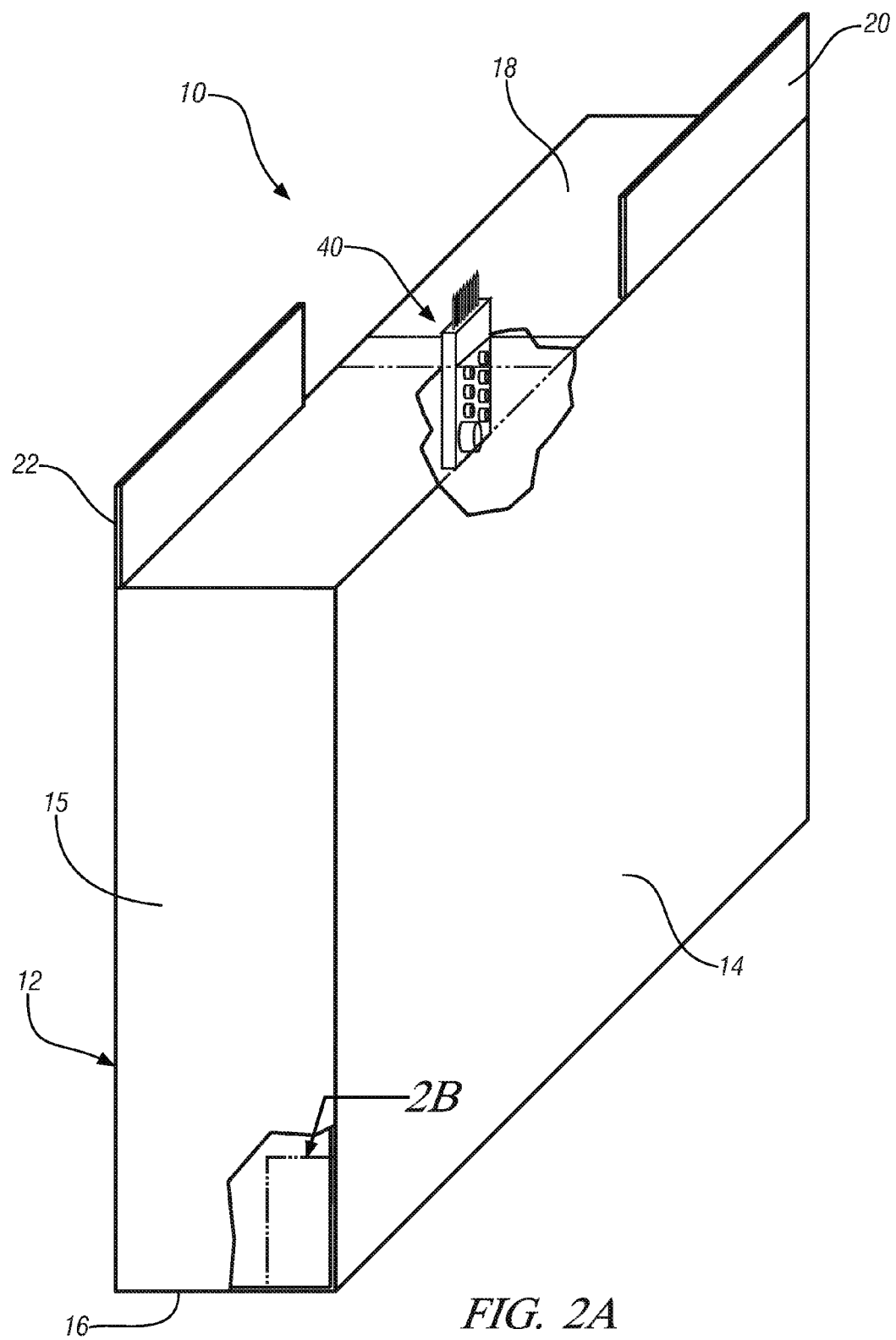
FIG. 2A is a perspective view of a single flat-cell for a lithium ion battery. The flat-cell is illustrated as a box-like container (sometimes called a "pouch") with generally parallel, rectangular sides and ends. The internal volume of the flat-cell would be filled with generally flat rectangular layers of electrode stacks. The electrodes in the stack are typically connected in a parallel circuit arrangement so that the stack functions like a single cell.

FIG. 2A is a perspective view of the outline of a flat-cell 10 including an electrode assembly for a lithium-ion battery (or part of a battery). Flat-cell 10 comprises a box-like pouch 12 which has two generally flat, rectangular, parallel, major facing sides 14 (only a front side visible in FIG. 2A) connected by two generally flat, rectangular, parallel, smaller end sides 15 (only one end visible in FIG. 2A). The near left-end side 15 in FIG. 2A has a fragment removed to illustrate a fragment of stacked electrodes which will be described in connection with FIG. 2B. Pouch 12 has a bottom side 16 and a top closure side 18. The respective sides of pouch 12 may be formed of aluminum sheet or foil, both sides of which are coated with polymer material suitable to insulate the metal from the cell elements and from any adjacent cells. Extending upwardly from the top edges of major sides 14 of pouch 12 are metal tabs 20, 22 for making electrical parallel connections respectively with the negative and positive electrodes of an electrode assembly fitted within the internal volume of pouch 12.

Figure 2B:
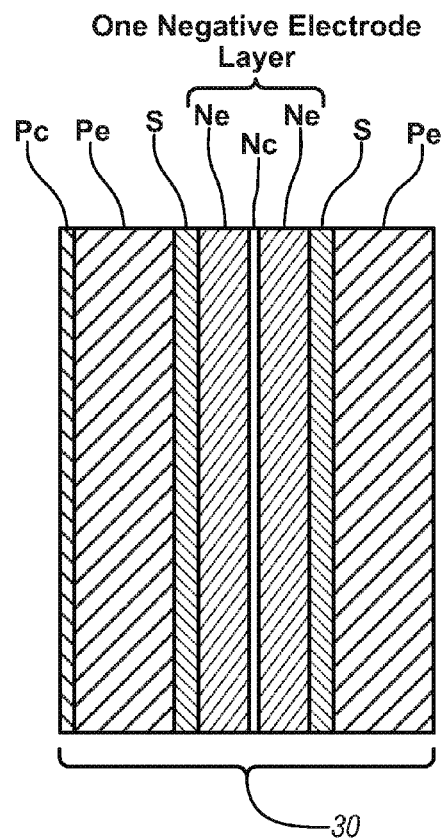
FIG. 2B is an enlarged view of a fragment of one repeat sequence of an electrode assembly, in a flat cell containing rectangular flat electrodes. Such a repeat sequence may be one of many electrode assemblies stacked, or folded and stacked, so as to fill the flat cell and be connected in electrical parallel arrangement.

Pouch 12 is sized and shaped to hold a stack of repeated layers of lithium-ion cell components. FIG. 2B illustrates a fragment of one repeat unit 30 of layers of cell components that would be inserted within pouch 12 before top closure member 18 is sealed to the side members 14 and end members 15 of the pouch 12. The filled pouch with its suitably arranged and stacked layers of electrode members (described in the following paragraphs of this specification) constitutes a pouch-cell 10 for a lithium-ion battery.

Inserted through the top 18 of pouch 12 is a substrate-supported reference electrode array 40 which is described in detail below in this specification and further illustrated in FIG. 3. As will be described, reference electrode array 40 is inserted at a suitable location into a cell of electrode members.

As stated, FIG. 2B is an enlarged illustration of one repeat unit of several repeat units (for example, five to fifteen units) of the layers of lithium-ion cell materials in which each layer may be sized to complement the length and width dimensions of sides 14 so as to fit as layers parallel to and between sides 14 with edges of the stacked layers lying against the ends 15 and bottom 16 and top 18 of pouch 12.

FIG. 2B may be considered as illustrating the edges of layered cell materials from the partially cut-open end of the pouch as indicated in FIG. 2A. The illustration of FIG. 2B is enlarged so as to see edges of the respective, thin layers in the single repeating unit 30 of cell materials in this illustrative embodiment.

In FIG. 2B, starting at the left side of repeat unit 30, a layer of positive electrode coating material, Pe, is coated onto aluminum foil, Pc, which serves as the positive conductor for the electrode material. The other side of the layer of positive electrode material, Pe, lies against one side of separator, S. Lying against the other side of separator, S, is negative electrode coating material, Ne, which is coated onto copper foil, Nc, which serves as the negative electrode conductor. Pressed against the other side of copper foil, Nc, is another layer of negative electrode coating material, Ne. A second separator, S, lies against the negative electrode material, Ne, and isolates it from positive electrode coating material, Pe, at the right edge of the FIG. 2B illustration. The two layers of negative electrode material, Ne, coated on opposite sides of copper foil, Nc, are proportioned to form one negative electrode layer in this repeat unit. And the right-hand layer of positive electrode material, Pe, (as illustrated in FIG. 2B) forms a positive electrode layer with an aluminum foil layer and positive electrode material layer of a adjoining repeat unit (not shown in FIG. 2B). While the above describes a typical electrode assembly, there may be different versions of equivalent or superior utility, thus the assembly described above is intended only as an example.

Positive electrode material (such as used in making positive electrode material layers, Pe, in FIG. 2B) is typically composed of particles of a material that contains lithium in its equilibrium state and reacts with lithium at high potential. Examples include spinel phase $LiMn_2O_4$ (called "spinel"), layered metal oxides including $LiCoO_2$, $Li(Ni_{1/3}Mn_{1/3}Co_{1/3})O_2$, $Li(Ni_{1/2}Mn_{1/2})O_2$, and polyanion materials like $LiFePO_4$ and $Li_2FeSiO_2$. Those particles are mechanically and electrically connected to each other and to a metal foil substrate (typically aluminum foil) current collector (Pc in FIG. 2B) by a polymer binder (typically polyvinylidene difluoride, PVDF) made conductive by the addition of a few weight percent of a conductive diluents such as carbon black. The Pe coating on the Pc foil is typically tens of microns thick and the foil is typically 10-30 microns thick. The particles of reactive material are typically a few microns in diameter and may be agglomerates of smaller particles that are sub-micron in diameter (that are themselves polycrystalline meaning that they are further divided into many crystalline grains).

Negative electrode material (as represented by layers Ne in FIG. 2B) is typically composed of particles of a material that does not contain lithium in its equilibrium state but reacts with lithium at low electrochemical potential. Examples include carbon (graphite or hard or soft disordered forms), silicon, tin and composites of those with other elements. In general, the most common negative electrode material comprises synthetic or natural forms of graphite. Those particles are mechanically and electrically connected to each other and to a metal foil substrate (Nc, typically copper foil) current collector by a polymer binder (typically polyvinylidene difluoride, PVDF, but styrene butadiene rubber, SBR, ethylene-propylene-diene monomer, EPDM, carboxy-methyl cellulose, CMC, and other binders are possible) made conductive by the addition of a few weight percent of a conductive diluents such as carbon black. The coating on the foil is typically tens of microns thick and the foil is typically 10-30 microns thick. The particles of reactive material are typically a few microns in diameter and may be agglomerates of smaller particles that are sub-micron in diameter (that are themselves polycrystalline meaning that they are further divided into many crystalline grains).

Positive and negative electrodes are typically "calendered" meaning that they are compacted with a pressure applied perpendicular to the plane of the substrate so that the particles are as close to one another as reasonably possible (without degrading the particles themselves). The resulting porosities are typically less than 40%, some as low as 10%.

Separators (such as represented by layers S in FIG. 2B) are typically composed of a porous (35% to 50% or higher) polyolefin membrane 25-30 microns thick (typically polypropylene or polyethylene or some composite of both). Often separators are modified, for instance by the addition of electrically non-conductive ceramic particles (for example, alumina or silica) that are coated on the polymer membrane surfaces using a binder like PVDF or embedded throughout the bulk (so positioned during or after the synthesis of the membrane). The pores of the separators and of the electrodes are filled with a liquid electrolyte in an amount that wets and maintains ionic conductivity with the facing positive and negative electrode materials.

Electrolytes are liquids, gels or solids generally made of salts dissolved in solvents. A typical salt in many commercial cells is $LiPF_6$. But $LiBF_4$, LiBOB (lithium bis-oxylatoborate) and $LiClO_4$ are also used, though often for research. Suitable typical solvents are mixtures of two or more organic carbonates. The carbonates can be linear or cyclic in structure. Typical mixtures contain at least one of each structure. Ethylene carbonate (EC) is a cyclic structured option that is most common and is typically paired with dimethyl carbonate (DMC), diethyl carbonate (DEC), ethyl methyl carbonate (EMC) or some combination thereof. Typically, electrolytes also contain additives that affect the electrochemistry in the cell under certain conditions like high or low temperature or high or low rate operation, or the durability of the cell over time and/or cycling. Vinyl carbonate (VC) is a typical additive. A once exotic but now considered potential replacement for this type of electrolyte is an ionic liquid where the salt and the solvent are one material that is essentially a molten salt at room temperature, and ionic liquids that act as solvents for dissolved salts are also feasible. Moreover, there are solid electrolytes that to some extent work acceptably well for certain conditions such as low rate and high temperature operation. Using a solid electrolyte may remove the need for a separator and liquid electrolyte, or may be used in conjunction. Solid electrolytes are typically composed of a lithium salt in a solid polymer such as polyethylene oxide, or can be made of lithium phosphorous oxynitride or LISICON ceramic 'glass' (LISICON=lithium super ion conductor).

The assembly of a positive current collector (Pc), positive electrode coating (Pe), separator (S), negative electrode coating (Ne) and negative electrode current collector (Nc) with electrolyte in the pores of the electrode coatings and separator. This grouping of components is called the electrode assembly, it defines the chemical makeup of the cell system but does not describe the cell packaging, internal tabbing (internal electrical connections among the electrodes and the cell terminals) and external terminals (the + and − terminals outside the cell that makes contact with the external circuit). Because Ne and Pe coatings are coated on both sides of their respective current collectors, the rudimentary electrode assembly repeat unit in this example is PcPeSNeNcNeSPe.

Thus, several (for example, five to fifteen) repeat units of an electrode assembly, as illustrated in FIG. 2B, are packaged in a pouch 12 in forming a pouch-cell 10. In some embodiments of pouch cells, each of the negative electrode connectors, Nc, are joined in electrical parallel circuit connection and these Nc connecters may be connected, for example, to metal tab 22 of pouch 12. Similarly, each of the positive electrode connectors, Pc, is joined in parallel arrangement to metal tab 20 of pouch 12 in further assembly of pouch-cell 10.

In practices of this invention, an array of reference electrodes is adapted to monitor the operation of a lithium-ion battery. For example, one or more arrays of reference electrodes may be used in each pouch-cell (or other packaging unit such as metal cans and prismatic shapes) of a lithium-ion battery. By way of illustration, an example of a reference electrode array 40 is illustrated in FIG. 2A. In this exemplary illustration, reference electrode array 40 is placed in an upper edge of a layer of separator, S, near the top of flat-cell 10. One or more reference electrode arrays may be placed in each cell for monitoring the discharging and charging of individual negative and positive electrodes in a cell or electrically connected combinations of negative and positive electrodes.

Figure 3:
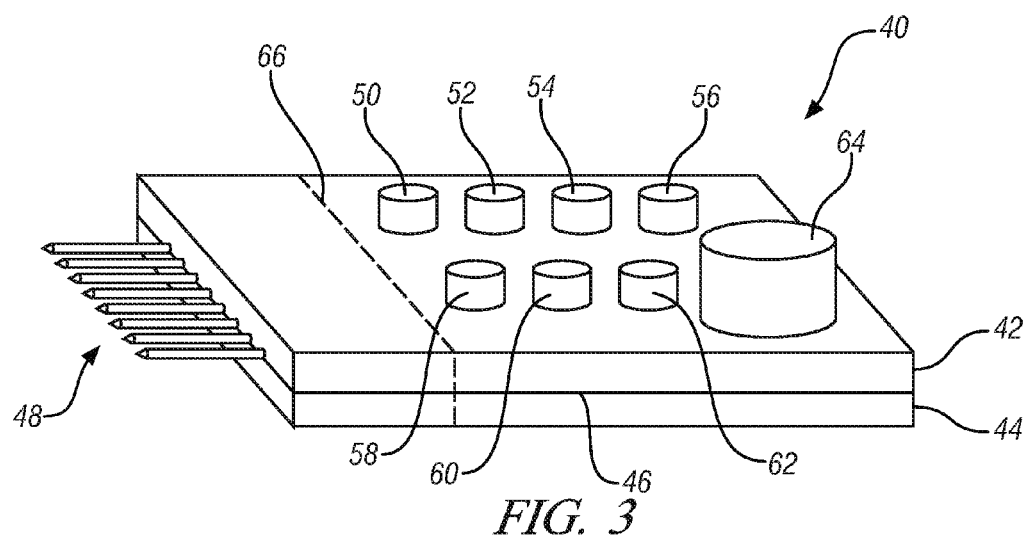
FIG. 3 is a schematic illustration of a silicon nitride chip-supported reference electrode array for a flat-cell of a lithium-ion battery.

An enlarged view of reference electrode array 40 (seen in FIG. 2A) is presented in FIG. 3. In accordance with embodiments of this invention, an array of reference electrodes comprises several separately formed reference electrode materials, closely grouped on a common support or base, where each electrode is composed to provide an useful electrode potential when connected in a circuit (probably a high impedance circuit) with a negative electrode or, alternatively, when connected in a circuit (probably a high impedance) with a positive electrode. So each reference electrode material is preferably suitable for producing a useful measurement potential when connected with either a positive or negative electrode of a lithium-ion cell or assembly of cells. For purposes of illustration, a reference electrode array will be described that is devised for use with lithium-graphite negative electrode materials and $LiFePO_4$ positive electrode materials. Reference is made to FIG. 3.

One embodiment of the array may be a sandwich of silicon nitride wafer chips (electrical insulator, chemically, and electrochemically inert in a Li-ion environment) with wires that run down the center of the sandwich from one edge to connect to pads of reference electrode material, each placed on the surface (or partially embedded in a small hole) of one of the chips. The array and its substrate are sized and shaped to fit in a lithium-ion cell application. For example, each reference electrode pad may be a micrometer-sized electrode containing a potentially suitable reference electrode material and affixed to the chip in such a way that electrolyte can access the reference electrode pad but not the junction between the lead wire for each pad found below the pad and that leads from the space between the chips through an appropriately sized hole in the chip below the pad (not shown in FIG. 3). In FIG. 3, equal-sized, rectangular-shaped silicon nitride chips 42, 44 are bonded at the interface 46 between their facing surfaces. These chips 42, 44 are sized and shaped to be inserted in a lithium-ion cell near electrodes (or electrode layers) that they are designed to monitor. The chips may, for example, have thicknesses in the micrometer size range and side dimensions or diameter dimensions in the micrometer to millimeter size range. In the example illustrated in FIG. 3, eight lead wires (collectively, 48, in FIG. 3) extend between chips 42, 44. Each lead wire is separated from the others and one lead wire is connected to each of the eight separate and distinct pads 50, 52, 54, 56, 58, 60, 62, 64 of reference electrode material in or on the surface of silicon nitride chip 42. The respective connections between each lead wire and its reference electrode material are isolated within the chip material. Thus, the right end of the silicon nitride chip 42, 44 assembly is intended to be immersed in the electrolyte of a lithium-ion cell up to about immersion line 66 so that each pad of reference electrode material is in electrochemical contact with the electrolyte. For example, the right end of the chips 42, 44 may be inserted into an opening cut into a porous separator which is saturated with electrolyte. But the portion of the chip assembly 40 to the left (as viewed in FIG. 3) of immersion line 66 extends outside of contact with the electrolyte of the lithium-ion cell. The lead wires 48 and their connections with their respective pads of reference electrode material are isolated from any physical contact with electrolyte or the material of a working electrode.

In this illustrative embodiment, eight pads of reference electrode materials are used, but this number may vary (increase or decrease) depending on the electrochemical requirements of a cell or electrode assembly, and available space within a battery package. In this embodiment, three pads (50, 54, and 60) of $Li_{5.5}Ti_5O_{12}$, two pads (52, 62) of $Li_{0.5}Al$ and two pads (56, 58) of $Li_{0.5}FePO_4$ are used in addition to one, probably larger, pad 64 composed of volumetrically and gravimetrically efficient unsaturated Li-storage material like $LiC_{12}$. For example, each of the seven pads 50, 52, 54, 56, 58, 60, and 62 may have like shapes and sizes. They may, for example, conveniently be in the shapes of round cylinders having heights of nanometer size to micrometer size and similarly sized diameters. A pad intended to supplying lithium may be slightly larger. The substrate for the reference electrode array is sized to carry the array and leads and to fit in an intended cell environment.

As is well understood by those skilled in the art, an external controller (often referred to as a potentiostat) is used to set the potential of the reference electrode pad to be charged relative to that electrode used to charge the reference electrode such that current flow charges the reference electrode pad. Such controllers can be quite small in scale and can be included in chips integrated within boards upon which microprocessors are mounted within conventional controllers. The active reference electrode materials may be mixed with polymeric binder and/or conductive diluents materials for making a cohesive electrode pad and for bonding each pad to a suitable base such as a silicon nitride chip. The amount of active material in each pad or dot of reference electrode material is determined as enough to sustain its intended period of operation in the cell.

The space between the chips 42, 44 may be filled with a chemically and electrochemically inert and electrically insulating epoxy or glue. The chip sandwich, above the region where the pads are located, may be covered in a coating suitable for incorporation in the sealed-edge of a pouch cell or welded metal can of a hard-sided cylindrical or prismatic cell.

The distinct lead wires 48 would extend outside of the cell and connect to a suitable electrical/computing bus through an appropriate connector. The uncoated part of the chip sandwich inside of the cell would be accessed by electrolyte and be part of the electrochemical environment. The placement of the chip sandwich should be such that local electrolyte polarization is minimized, i.e. away from high-ionic current and thermal gradients such as those found in the vicinity of the cell's terminals, especially if they are placed close to one another.

The use of duplicate reference electrode materials of the same active material and the use of different active materials complement the array of reference electrodes and permit testing (for example, computer-based testing) of the utility of a reference electrode in assessing the state of charge or state of life of a positive or negative electrode of a lithium-ion cell. For example, upon a testing initiative, a reference electrode may be connected (probably with a high impedance connection) to a negative electrode and an electrochemical potential measured for comparison with recent test data or an expected value. If the measured value is out-of-line with an anticipated result, the same test of present negative electrode potential may be performed with a different reference electrode material until the state of charge data is considered credible. Further testing may be conducted without reliance on a discredited reference electrode and/or the discredited reference electrode may receive additional lithium or have lithium removed until the potential measured between it and the negative electrode reaches a value considered credible.

This plurality of reference electrode active materials is utilized to test and confirm the reliability of individual reference electrodes within the closely-grouped array. And one or more of the electrodes in the array may be used to adjust the potential of the other materials by changing their state in a manner such as subtracting lithium from or adding lithium to the other electrodes in the array. Alternatively, or in addition, lithium from one or both of the negative and/or positive electrodes may be used to perform this function. Preferably, each of the electrode materials will be useful with both the negative electrode(s) and positive electrode(s) of a cell or a stack of a plurality of repeat cell units. Each of the at least two reference electrode materials arranged closely in each array may have a separate electrical lead such that each reference electrode can be used to test each working electrode separately, simultaneously or in conjunction. And the separate data from each reference electrode in an array can be individually consulted by a computer-based control system to track the state of charge of the positive and negative electrodes in a cell independent of one another to ensure that the state of charge of the entire cell is properly assessed. This may be especially necessary for cells using $LiFePO_4$ as the positive electrode active material where state of charge assessment of the full cell is quite challenging without a confirmed reliable reference electrode because of the exceedingly consistent voltage as measured between the positive and negative electrodes over a large state of charge domain. Such state of charge data is useful for many reasons such as to ensure that lithium is not plated on the negative electrode during rapid charging at low temperature and to correlate the electrodes and conditions responsible for impedance increases or active material losses during a cell's life.

Practices of the invention have been described by reference to some illustrative embodiments. But the scope of the invention is not limited to or by such illustrative disclosures.

The invention claimed is:

1. A lithium-ion cell comprising a positive electrode with a lithium-reaction active positive electrode material and a negative electrode with a lithium-reaction active negative electrode material, and an array of discrete reference electrodes carried on a common electrically insulating ceramic substrate for independently determining the state of charge of each of the positive electrode material and negative electrode material; the positive electrode, the negative electrode and the array of reference electrodes carried on the common electrically insulating ceramic substrate being in electrochemical contact with a common electrolyte; the reference electrode array comprising:

a first group of at least two duplicate reference electrodes, each of the duplicate reference electrodes comprising a first composition of reference electrode material; and at least one additional group of at least two duplicate reference electrodes, each additional group of duplicate reference electrodes comprising a composition of reference electrode material that is different from the first composition of reference electrode material and from the composition of reference material of each additional group of duplicate reference electrodes;

where all such groups of duplicate reference electrodes are grouped on the common electrically insulating ceramic substrate for effectively equivalent determination of an electrochemical potential of the positive electrode material and the negative electrode material and each reference electrode is separately connectable with at least one of the positive electrode material and the negative electrode material.

2. A lithium-ion cell as recited in claim 1 in which the common electrically insulating ceramic substrate has been inserted therein is partially immersed in the electrolyte.

3. A lithium-ion cell as recited in claim 2 in which the substrate carries a separate electrically connecting wire from each reference electrode to a location outside the electrolyte, the connecting wire serving for separate connection to the positive electrode or the negative electrode or to another reference electrode.

4. A lithium-ion cell as recited in claim 2 in which the ceramic substrate comprises silicon nitride.

5. A lithium-ion cell as recited in claim 2 in which each of the reference electrodes has a maximum dimension of no larger than about fifty micrometers.

6. A lithium-ion cell as recited in claim 1 further comprising, in addition to the groups of duplicate reference electrodes, at least one reference electrode composed to serve as a source of lithium for other reference electrodes.

7. A lithium-ion cell as recited in claim 1 in which each reference electrode in one of the groups of reference electrodes comprises $Li_{5.5}Ti_5O_{12}$.

8. A lithium-ion cell as recited in claim 1 in which each reference electrode in one of the groups reference electrodes comprises $Li_{0.5}Al$.

9. A lithium-ion cell as recited in claim 1 in which each reference electrode in one of the groups of reference electrodes comprises $Li_{0.5}FePO_4$.

10. A lithium-ion cell as recited in claim 6 in which the at least one reference electrode comprises lithium intercalated in carbon.

11. A lithium-ion cell as recited in claim 1 in which each reference electrode is connectable for charging with lithium from at least one of another reference electrode, the positive electrode, or the negative electrode.

12. A lithium-ion cell comprising an electrode stack comprising repeated layers of a positive electrode conductor foil with a coating of a lithium-reaction active positive electrode material, a separator, a negative electrode conductor foil coated on both sides with a lithium-reaction active negative electrode material, and a second separator; and, inserted in a repeated layer of the electrode stack, an array of discrete reference electrodes carried on a common electrically insulating ceramic substrate chip for independently determining the state of charge of each of adjacent positive electrode material and negative electrode material; the positive electrode, the negative electrode and the array of reference electrodes being in electrochemical contact with a common electrolyte; the array of discrete reference electrodes comprising:

at least two duplicate reference electrodes comprising a first composition of reference electrode material;

at least two duplicate reference electrodes comprising a composition of reference electrode material that is different from the first composition of reference electrode material;

where all such reference electrodes are in the nanometer to micrometer size range and are grouped on the electrically insulating ceramic substrate chip for effectively equivalent determination of an electrochemical potential of adjacent positive electrode material and adjacent negative electrode material, and each reference electrode is separately connectable with at least one of the positive electrode material and the negative electrode material.

13. A lithium-ion cell as recited in claim 12 in which the chip carries a separate electrically connecting wire from each reference electrode to a location outside the electrolyte, the connecting wire serving for separate connection to the positive electrode or the negative electrode or to another reference electrode.

14. A lithium-ion cell as recited in claim 12 in which each reference electrode is connectable for charging with lithium from at least one of another reference electrode, the positive electrode, or the negative electrode.

* * * * *